(12) United States Patent
Yi et al.

(10) Patent No.: US 11,140,330 B2
(45) Date of Patent: Oct. 5, 2021

(54) APPARATUS FOR STABILIZING DIGITAL IMAGE, OPERATING METHOD THEREOF, AND ELECTRONIC DEVICE HAVING THE SAME

(71) Applicant: Samsung Electronics Co., Ltd., Suwon-si (KR)

(72) Inventors: Eunjik Yi, Seoul (KR); Sooman Jeong, Seoul (KR); Heeshin Kim, Hwaseong-si (KR); Hwansun Sung, Seongnam-si (KR); Suyoung Lee, Daejeon (KR); Jeongwook Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/038,952

(22) Filed: Sep. 30, 2020

(65) Prior Publication Data

US 2021/0266443 A1   Aug. 26, 2021

(30) Foreign Application Priority Data

Feb. 24, 2020   (KR) .................. 10-2020-0022364

(51) Int. Cl.
| | |
|---|---|
| *H04N 5/235* | (2006.01) |
| *H04N 9/04* | (2006.01) |
| *H04N 5/238* | (2006.01) |
| *H04N 5/76* | (2006.01) |
| *H04N 5/247* | (2006.01) |

(52) U.S. Cl.
CPC .......... *H04N 5/2351* (2013.01); *H04N 5/238* (2013.01); *H04N 5/247* (2013.01); *H04N 5/76* (2013.01); *H04N 9/045* (2013.01)

(58) Field of Classification Search
None
See application file for complete search history.

(56) References Cited

U.S. PATENT DOCUMENTS

| | | | |
|---|---|---|---|
| 5,903,307 | A | 5/1999 | Hwang |
| 7,450,155 | B2 | 11/2008 | Nakanishi et al. |
| 9,305,362 | B1 | 4/2016 | Szedo et al. |
| 9,565,362 | B2 | 2/2017 | Kudo |
| 9,860,448 | B2 | 1/2018 | Yoo et al. |
| 9,992,416 | B2 | 6/2018 | Vacura |
| 10,257,421 | B2 | 4/2019 | Wu et al. |
| 10,326,936 | B2 | 6/2019 | Jeon et al. |
| 2009/0067051 | A1* | 3/2009 | Cho .................. G02B 26/0883 359/554 |
| 2015/0219920 | A1 | 8/2015 | Ando et al. |
| 2017/0272663 | A1* | 9/2017 | Wang ................ H04N 5/23293 |
| 2019/0007690 | A1* | 1/2019 | Varadarajan ......... H04N 19/124 |
| 2020/0118287 | A1* | 4/2020 | Hsieh ..................... G06T 5/006 |

* cited by examiner

*Primary Examiner* — Eileen M Adams
(74) *Attorney, Agent, or Firm* — Harness, Dickey & Pierce, P.L.C.

(57) ABSTRACT

A method of operating a digital image stabilization apparatus including acquiring motion information by a first camera for capturing an image of a first field of view, controlling a prism of a second camera using the motion information, acquiring a main image and a peripheral image by a second camera for capturing an image of a second field of view, the second field of view being narrower than the first field of view, and generating a stabilized frame image related to the main image using the motion information and the peripheral image may be provided.

20 Claims, 16 Drawing Sheets

|  | TELE (f1) | WIDE (f2) | ULTRA WIDE (f3) |
| --- | --- | --- | --- |
| CASE 1 | SECOND CAMERA (PRISM) | FIRST CAMERA |  |
| CASE 2 |  | SECOND CAMERA (PRISM) | FIRST CAMERA |

FIG. 15

APPARATUS FOR STABILIZING DIGITAL IMAGE, OPERATING METHOD THEREOF, AND ELECTRONIC DEVICE HAVING THE SAME

CROSS-REFERENCE TO RELATED APPLICATION(S)

This application claims benefit of priority to Korean Patent Application No. 10-2020-0022364 filed on Feb. 24, 2020 in the Korean Intellectual Property Office, the disclosure of which is incorporated herein by reference in its entirety.

BACKGROUND

The present inventive concepts relate to a digital image stabilization apparatus, an operating method of thereof, and an electronic device including the same.

In general, with the development of digital technology, digital image capturing devices have become widely used. In particular, digital image capturing devices have been distributed to be included and used in portable terminals such as smartphones or tablet PCs. Images captured by the digital image capturing devices may have a digital image format. Digital images may be processed in various manners, depending on purposes thereof. Digital images captured using the digital image capturing devices may be edited or processed much more easily, compared to images captured using a film in the past. For example, the digital image capturing devices may electronically enlarge or reduce a portion of captured images.

SUMMARY

An aspect of the present inventive concepts is to provide a digital image stabilization apparatus performing a high-performance video stabilization function without loss of field of view or deterioration of image quality, an operation method thereof, and/or an electronic device having the same.

According to an aspect of the present inventive concepts, a digital image stabilization apparatus may include a first camera configured to acquire a first image of a first field of view, a second camera configured to acquire a second image of a second field of view, the second field of view being narrower than the first field of view, a first buffer configured to receive and store a main image of the second field of view for an object from the second camera, a second buffer configured to receive and store a peripheral image for the main image from the second camera, and a processor configured to control the first camera, the second camera, the first buffer, and the second buffer and perform a digital image stabilization function. The processor may be configured to control a prism of the second camera using motion information estimated from the first image, for acquiring the peripheral image from the second camera.

According to an aspect of the present inventive concepts, a method of operating a digital image stabilization apparatus may include acquiring motion information by a first camera for capturing an image of a first field of view, controlling a prism of a second camera using the motion information, acquiring a main image and a peripheral image by a second camera for capturing an image of a second field of view, the second field of view being narrower than the first field of view, and generating a stabilized frame image related to the main image using the motion information and the peripheral image.

According to an aspect of the present inventive concepts, an electronic device may include a camera module having a first camera and a second camera, the first camera configured to capture a first field of view, the second camera configured to capture a second field of view, and the second field of view being narrower than the first field of view, a memory configured to store a code, a display device configured to display a main image of the second camera, an input/output interface device configured to input data into an input/output device and to output data from the input/output device, a communication interface device configured to perform communications with an external device, and at least one processor configured to control the camera module, the memory, the display device, the input/output interface device, and the communication interface device, the at least one processor configured to execute the code to control a prism of the second camera using motion information acquired from the first camera.

BRIEF DESCRIPTION OF DRAWINGS

The above and other aspects, features, and advantages of the present inventive concepts will be more clearly understood from the following detailed description, taken in conjunction with the accompanying drawings, in which:

FIG. 15 is a view illustrating cases in which a digital image stabilization technique of the rear cameras 2800A, 2800B, and 2800C illustrated in FIG. 14B is applied.

DETAILED DESCRIPTION

Hereinafter, some example embodiments of the present inventive concepts will be described with reference to the accompanying drawings.

An electronic device according to an example embodiment of the present inventive concepts may drive a prism, in a camera module capable of driving the prism to control a field of view, to acquire a peripheral region of an image desired for video stabilization (VDIS) in a high-resolution. An electronic device according to an example embodiment of the present inventive concepts may perform a high-performance video stabilization function without loss of field of view or deterioration of image quality, compared to video stabilization using a margin of a conventional sensor.

Figure 1:
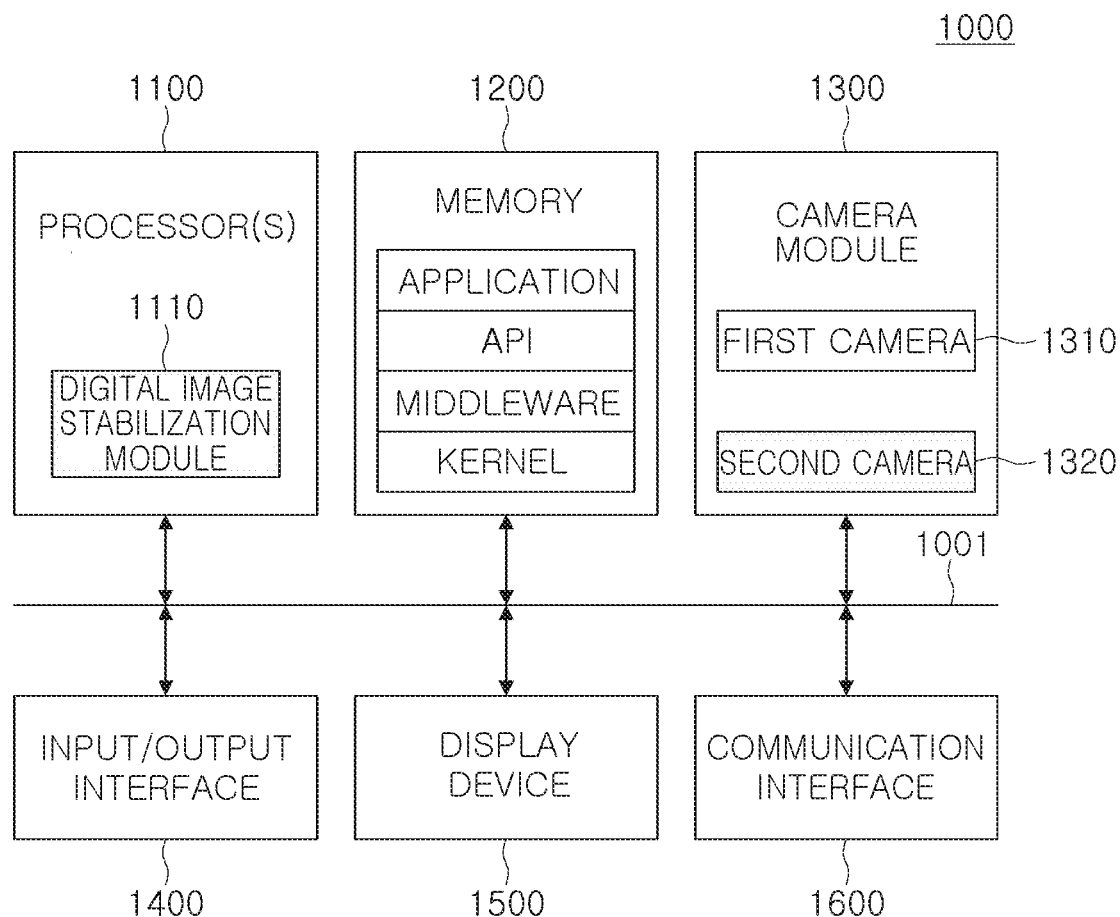
FIG. 1 is a view illustrating an electronic device 1000 according to an example embodiment of the present inventive concepts.

FIG. 1 is a view illustrating an electronic device 1000 according to an example embodiment of the present inventive concepts. Referring to FIG. 1, an electronic device 1000 may include at least one processor 1100 connected to a bus 1001, a memory 1200, a camera module 1300, an input/output interface device 1400, a display device 1500, and a communication interface device 1600.

The processor 1100 may include a central processing unit (CPU), an application processor (AP), or a communication processor (CP). The processor 1100 may perform, for example, an operation or a data processing related to control and/or communications of at least one other component of the electronic device 1000.

In an example embodiment, the processor 1100 may operate as an image processing unit (ISP) that processes image data collected by a first camera 1310 and a second camera 1320. For example, the processor 1100 may combine or correct the image data collected by the first camera 1310 and the second camera 1320, respectively. For example, the processor 1100 may execute a digital image stabilization module (e.g., a functional unit included in the processor) 1110 for stabilizing a main image for a moving subject.

The digital image stabilization module 1110 may acquire motion information from the first camera 1310, may control a prism of the second camera 1320 based on the acquired motion information, may acquire information of a peripheral image from the second camera 1320, and may use the information of the peripheral image to stabilize the main image related to the moving subject.

According to an example embodiment, the processor 1100 may generate a control signal for moving or rotating a reflector (or the prism, or a driver mounted on the reflector) in the second camera 1320. The processor 1100 may move or rotate the reflector, such that a field of view (FOV) of the second camera 1320 at a point at which the subject is disposed may be included inside of a field of view of the first camera 1310, or may be in contact with the inside of the field of view of the first camera 1310.

The memory 1200 may include a volatile memory or a non-volatile memory. The memory 1200 may store, for example, instructions or data related to at least one other component of the electronic device 1000.

In an example embodiment, the memory 1200 may store software or a program. The program may include, for example, a kernel, middleware, an application programming interface (API), or an application program. At least a portion of the kernel, the middleware, or the API may be referred to as an operating system. The kernel may control or manage, for example, system resources (e.g., the bus 1001, the processor 1100, or the memory 1200) used to execute an operation or function implemented in other programs (e.g., the middleware, the API, or the application program).

Further, the kernel may provide an interface for accessing individual components of the electronic device 1000 in the middleware, the API, or the application program, to control or manage the system resources. The middleware may act as an intermediary, for example, such that the API or the application program communicates with the kernel to exchange data. Further, the middleware may process requests for tasks, received from the application program, according to priorities thereof. For example, the middleware may assign priorities for using the system resources (e.g., the bus 1001, the processor 1100, or the memory 1200) of the electronic device 1000, to at least one of the application programs, and may process the requests for tasks. The API may be an interface through which the application program controls functions provided by the kernel or the middleware, and may include, for example, at least one interface or function (e.g., command) for file control, window control, image processing, text control, or the like.

For example, the memory 1200 may store a code related to the digital image stabilization module 1110.

The camera module 1300 may be implemented to acquire a photo or a video. The camera module 1300 may include the first camera 1310 and the second camera 1320. Although the camera module 1300 illustrated in FIG. 1 discloses the two cameras 1310 and 1320, it should be understood that the number of cameras of the present inventive concepts is not limited thereto.

In an example embodiment, the first camera 1310 and the second camera 1320 may be arranged to face the same direction, or may be arranged to be spaced apart from each other at a given distance. For example, the first camera 1310 and the second camera 1320 may be rear cameras arranged to face a rear surface of the electronic device 1000 (opposite to a surface of the electronic device 1000 that faces the display device 1500 or that has the display device 1500 thereon).

The first camera 1310 may be equipped with a wide-angle lens having a relatively wide field of view (e.g., a wide angle) and suitable for capturing a proximate subject. In an example embodiment, the first camera 1310 may be fixed to the electronic device 1000, such that the electronic device 1000 may capture a subject in a specific direction.

The second camera 1320 may be equipped with a telephoto lens having a relatively narrow field of view (FOV) and suitable for capturing a distant subject. In an example embodiment, the second camera 1320 may move the prism in upward, downward, left, and right directions to capture a subject in various directions. In this case, the prism may be controlled by the digital image stabilization module 1110 executed in the processor 1100. For example, the prism may be controlled under the control of the digital image stabilization module 1110 such that the second camera 1132 may acquire information of a peripheral image on a rapidly moving subject.

The input/output interface device 1400 may transmit, for example, commands or data, input from a user or other external device, to other component(s) of the electronic device 1000, or may output commands or data, received from other component(s) of the electronic device 1000, to a user or other external device.

The display device 1500 may include, for example, a liquid crystal display (LCD), a light emitting diode (LED) display, an organic light emitting diode (OLED) display, a microelectromechanical system (MEMS) display, or electronic paper display. The display device 1500 may display various contents (for example, texts, images, videos, icons, or symbols) to a user. The display device 1500 may include a touch screen. The display device 1500 may receive a touch input, a gesture input, an approach input, or a hovering input using, for example, an electronic pen or a user's body part.

The communication interface device 1600 may, for example, set communications between the electronic device 1000 and an external device (e.g., an external electronic device or a server). For example, the communication interface device 1600 may be connected to a network by wireless communications or wire communications, to communicate with the external device.

Although not illustrated, the electronic device 1000 may include various types of sensors. For example, the electronic device 1000 may include an acceleration sensor (e.g., a gyro sensor) for acquiring position information.

In a conventional electronic device, in order to implement video stabilization, a camera module may use an image of a peripheral portion as a buffer, in addition to a region of a field of view to be finally output. In an actual input size of a physical sensor, a certain peripheral region (e.g., margin) may be lost, when finally saving a video. In order to perform a high-performance video stabilization function, an up-scaling operation in which significant loss of a field of view and deterioration of image quality are caused may be desired.

In contrast, an electronic device 1000 according to an example embodiment of the present inventive concepts may move a field of view itself acquired by a sensor under high-speed control of a prism to perform an image stabilization function. As above, the electronic device 1000 according to an example embodiment of the present inventive concepts may not cause basic loss of a field of view, and may not desire an additional up-scaling process. Therefore, there may be no deterioration of image quality due to the image stabilization function.

Figure 2:
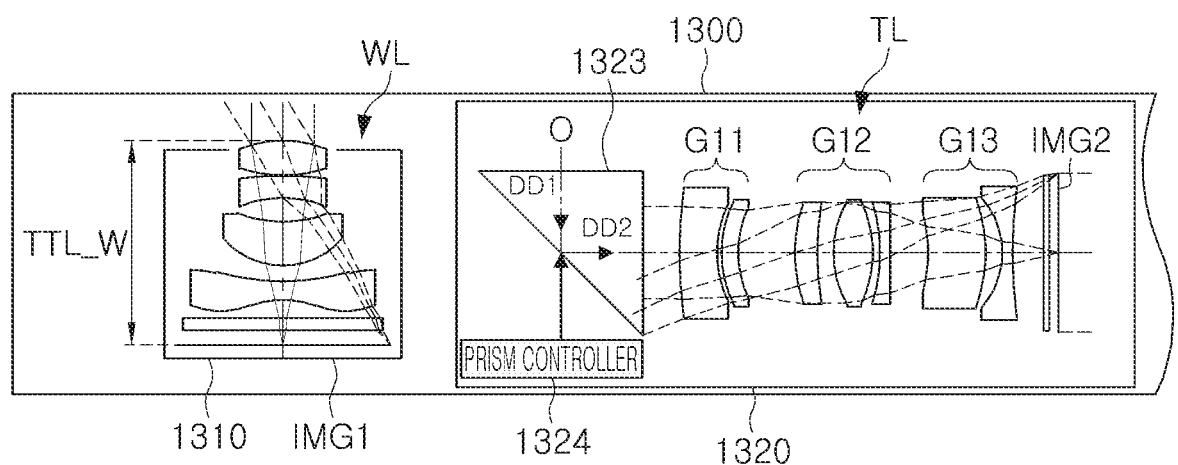
FIG. 2 is a view illustrating a camera module 1300 according to an example embodiment of the present inventive concepts.

FIG. 2 is a view illustrating a camera module 1300 according to an example embodiment of the present inventive concepts. Referring to FIG. 2, a camera module 1300 may include a first camera 1310 and a second camera 1320.

The camera module 1300 is illustrated to have a first optical lens assembly WL having a first field of view and a second optical lens assembly TL having a second field of view. In an example embodiment, the second field of view may be narrower than the first field of view. In this case, an image of the second field of view may be an image corresponding to a region to be actually recorded.

The first optical lens assembly WL may be, for example, a wide-angle short focus lens assembly. The second optical lens assembly TL may be a zoom lens assembly.

The first camera 1310 may include a first image sensor IMG1 capable of using light passing through the first optical lens assembly WL to acquire an image signal.

The second camera 1320 may include a second image sensor IMG2 capable of using light passing through the second optical lens assembly TL to acquire an image signal.

In an example embodiment, the first optical lens assembly WL may have a zoom magnification of a first section according to the first field of view, and the second optical lens assembly TL may have a zoom magnification of a second section according to the second field of view. A processor (1100, referring to FIG. 1) may use at least one of the first image sensor IMG1 or the second image sensor IMG2 to capture an image of a subject, and, when an image is captured according to the zoom magnification of the second section, a second lens group G12 and a third lens group G13 may be moved. For example, the zoom magnification of the first section may have a range of 1 to 1.9 times, and the zoom magnification of the second section may have a range of 2 to 3 times.

It should be understood that lens configurations of the first optical lens assembly WL and the second optical lens assembly TL are merely considered as an example embodiment.

The second camera 1320 may include the second image sensor IMG2, the second optical lens assembly TL, a prism 1323, and a prism controller 1324.

In the second camera 1320, an optical axis direction may be converted from a first direction DD1 to a second direction DD2 by the prism 1323 (e.g., a reflecting member). Lenses of the first optical lens assembly WL may be arranged, for example, in a direction, parallel to the first direction DD1. For example, the first direction DD1 may be a direction, parallel to a thickness direction of an electronic device (1000, referring to FIG. 1), and the second direction DD2 may be a direction, perpendicular to the thickness direction of the electronic device 1000. TTL_W illustrated in FIG. 2 may represent a total length of the first optical lens assembly WL, and the total length may represent a distance from an object side of an object-side lens to the first image sensor IMG1 along an optical axis.

The prism controller 1324 may control a driving direction of the prism 1323 under the control of the processor 1100. For example, the prism controller 1324 may control driving of the prism 1323, based on a control command according to execution of the digital image stabilization module 1110 of the processor 1100.

Figure 3:
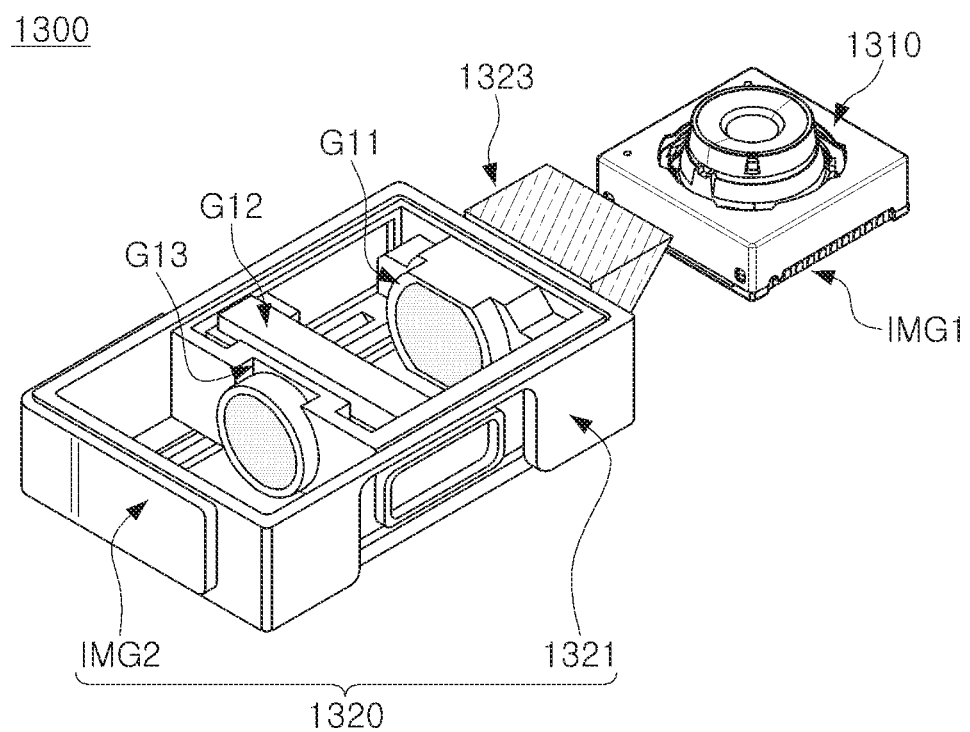
FIG. 3 is a view illustrating a configuration of a camera module 1300 according to an example embodiment of the present inventive concepts.

FIG. 3 is a view illustrating a configuration of a camera module 1300 according to an example embodiment of the present inventive concepts. Referring to FIG. 3, a second camera 1320 may change a driving direction of a prism 1323 attached to a housing 1321. Also, the second camera 1320 may move lens groups G12 and G13 to adjust zoom magnification.

Figure 4:
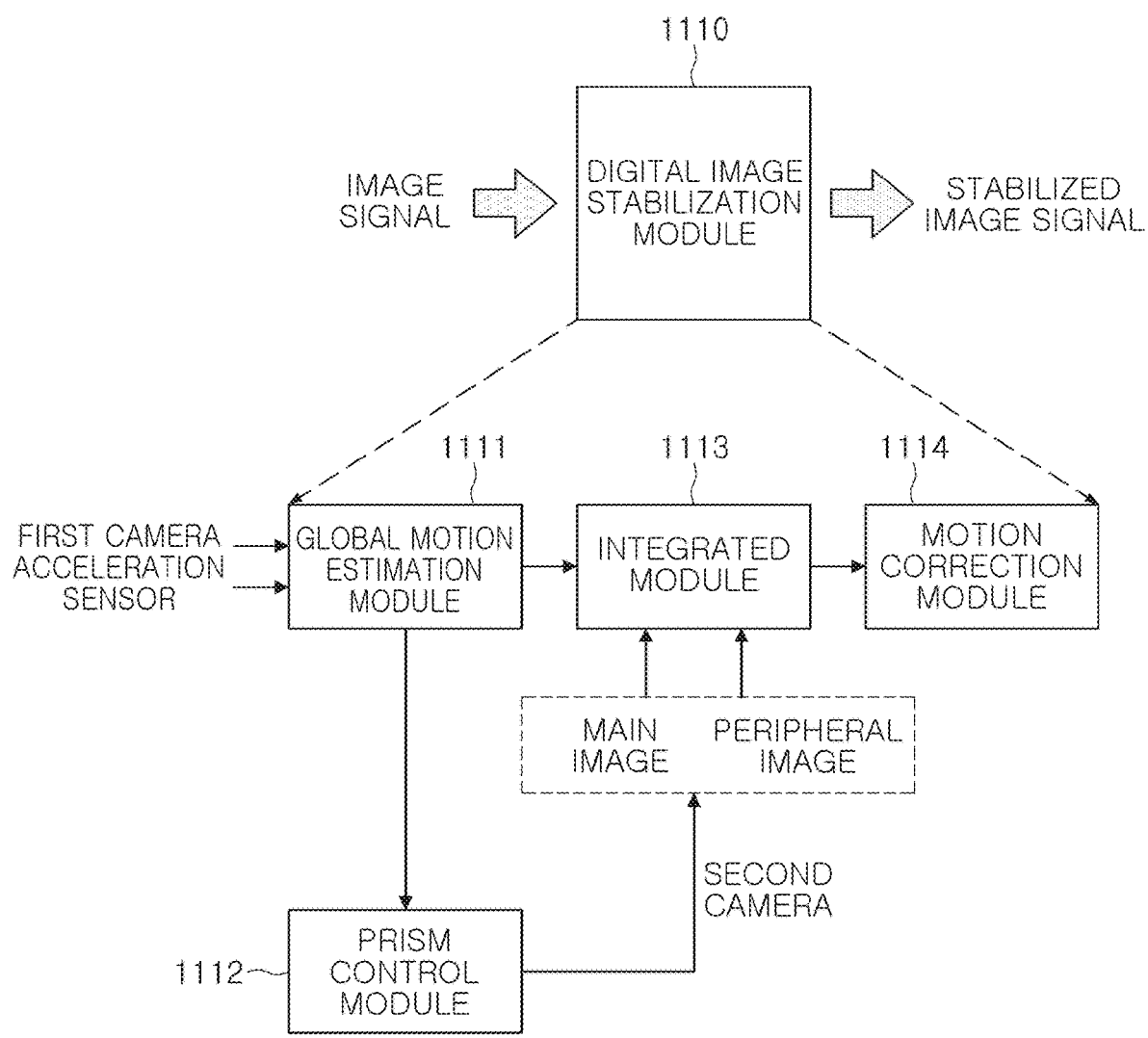
FIG. 4 is a view illustrating a digital image stabilization module 1110 according to an example embodiment of the present inventive concepts.

FIG. 4 is a view illustrating a digital image stabilization module 1110 according to an example embodiment of the present inventive concepts. Referring to FIG. 4, an image signal (e.g., a video signal or image data) may be output as a stabilized image signal (e.g., a stabilized video signal) by a digital image stabilization module 1110.

In general, a digital image stabilization operation may be an operation that attenuates vibration of an image to adjust unintended shaking with image processing. In a case of general image processing, the operation may focus on correction to remove shaking in the image. According to an example embodiment of the present inventive concepts, the digital image stabilization operation may use data of a sensor during image processing to provide a haptic effect such as vibration or the like together, in order to give a viewer a feeling of viewing a realistic image, while correcting shaking. Therefore, when the shaking is corrected using an acceleration sensor value of the data of the sensor, a screen shaking degree (or a stabilization degree) may be adjusted and displayed. Therefore, the viewer may enjoy a more realistic image.

The digital image stabilization module 1110 may include a global motion estimation module 1111, a prism control module 1112, an integrated module 1113, and a motion correction module 1114. It should be understood that components of the digital image stabilization module 1110 are not limited thereto.

The global motion estimation module 1111 may receive image data from a first camera 1310 and position data from an acceleration sensor, to estimate a shaking or moving direction of an image.

The prism control module 1112 may control a prism 1323, based on information of the shaking direction estimated by the global motion estimation module 1111.

The integrated module 1113 may receive global motion estimation information and image data of a second camera 1320, to generate an integrated image. In this case, the second camera 1320 may output main image data and peripheral image data. Motion image information of the first camera 1310 and peripheral image data of the second camera 1320 may be used to generate a stabilized image.

The motion correction module 1114 may perform motion correction using the stabilized image.

Figure 5:
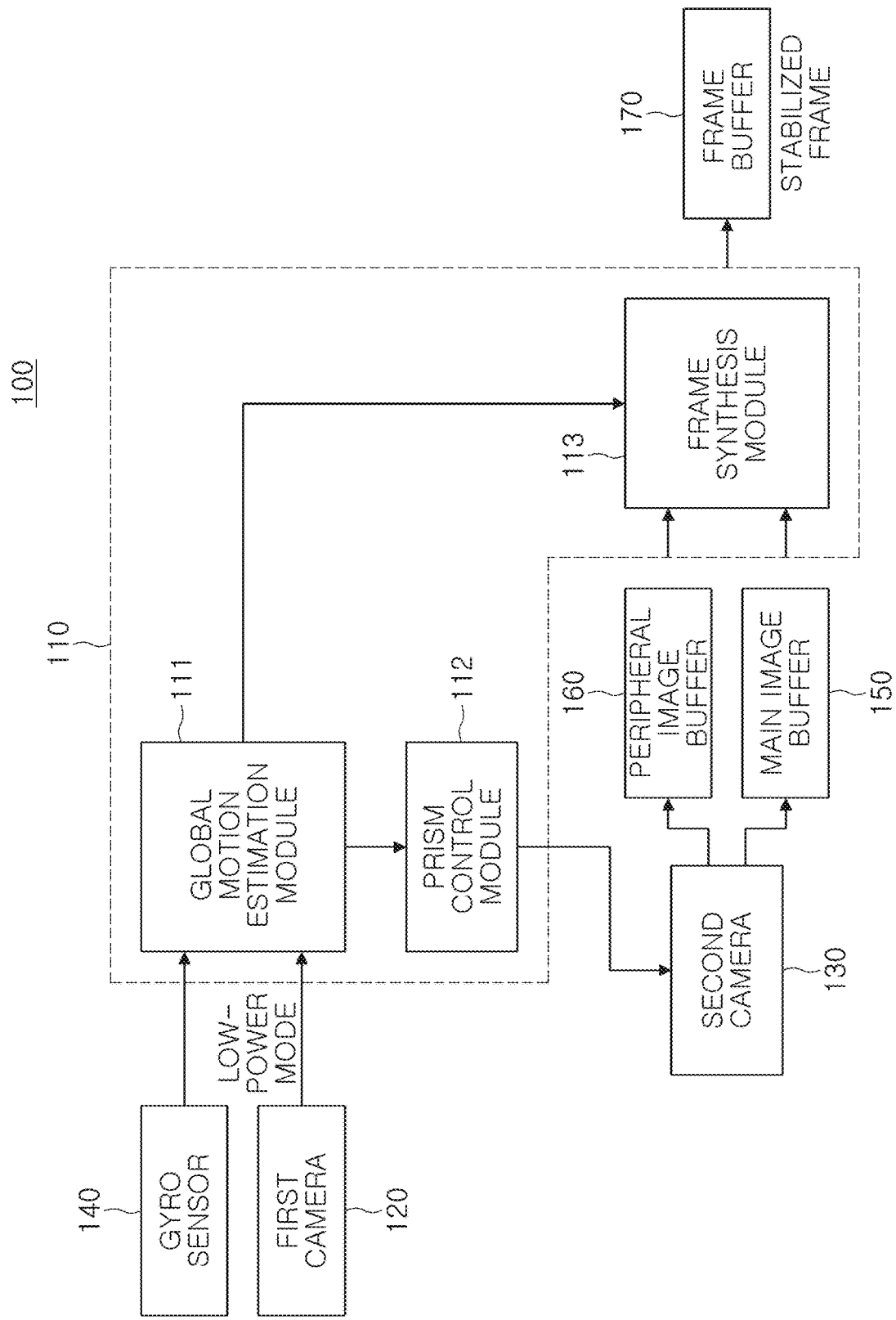
FIG. 5 is a view illustrating a digital image stabilization apparatus 100 according to an example embodiment of the present inventive concepts.

FIG. 5 is a view illustrating a digital image stabilization apparatus 100 according to an example embodiment of the present inventive concepts. Referring to FIG. 5, a digital image stabilization apparatus 100 may include a processor 110, a first camera 120, a second camera 130, a gyro sensor 140, a main image buffer (a first buffer, 150), a peripheral image buffer (a second buffer, 160), and a frame buffer 170.

The processor 110 may execute a digital image stabilization function. The digital image stabilization function may be performed by a global motion estimation module 111, a prism control module 112, and a frame synthesis module 113.

The first camera 120 may be implemented to acquire a first image of a first field of view.

The second camera 130 may be implemented to acquire a second image of a second field of view. In this case, the second field of view may be narrower than the first field of view. For example, the first camera 120 may be implemented to have an ultra wide angle, and the second camera 130 may be implemented to have a wide angle. Alternatively, the first camera 120 may be implemented to have a wide angle, and the second camera 130 may be implemented as a telephoto camera. An actual main camera recorded as a video may be the second camera 130. The second camera 130 may perform a field of view movement function by prism driving control.

The image acquired from the first camera 120 may be not directly used for actual video recording, but may be used as an input of an algorithm operating in the global motion estimation module 111.

The global motion estimation module 111 may predict a shaking direction of the entire image. For example, the global motion estimation module 111 may use an image with a wide field of view, acquired from the first camera 120, to predict an image shaking (movement) direction from a position of the second camera 130, and, based on this, a prism of the camera 130 may be controlled to acquire a peripheral image in a direction desirable for video stabilization.

Further, the global motion estimation module 111 may receive acceleration information of the gyro sensor 140, and may use the acceleration information to detect motion of an object. Although the gyro sensor 140 is illustrated in FIG. 5, a sensor for detecting the motion of the object is not be limited thereto. Various types of acceleration sensors may be used to detect the motion of an object.

The prism control module 112 may receive a predicted result value provided by the global motion estimation module 111, and may act to actually drive the prism of the second camera 130 in a desired direction.

The global motion estimation module 111 may not need a high-quality video. Therefore, the first camera 120 may operate in a low-resolution and low-power mode. Further, the first camera 120 may use a special sensor capable of acquiring an edge of an image at a relatively high speed, such as a dynamic vision sensor (DVS), not a red-green-blue (RGB) sensor. The second camera 130 may transmit two images, e.g., a main image and a peripheral image, to the main image buffer 150 and the peripheral image buffer 160, respectively. In an example embodiment, one main image and a plurality of peripheral images may be transmitted to a buffer queue in a single frame, according to a control speed of the prism and an exposed amount of time of the sensor.

In an example embodiment, the main image may be an image of the first field of view, when the prism is located in a central portion.

The frame synthesis module 113 may receive an image from the main image buffer 150 or the peripheral image buffer 160, and may use the peripheral image as a buffer margin region of a video stabilization algorithm, to finally generate a stabilized result frame. The stabilized frame may be stored in the frame buffer 170.

In an example embodiment, the frame synthesis module 113 may synthesize one peripheral image frame into one main image frame to generate a stabilized frame. In another example embodiment, the frame synthesis module 113 may synthesize a plurality of peripheral image frames into one main image frame to generate a stabilized frame.

A frame stored in the frame buffer 170 may be processed by an encoder. The encoded image may be stored in an external memory as a conventional video file.

In general, when illumination is relatively low, the sensor may have a relatively long exposed amount of time, compared with a case in which the illumination is relatively high. When illumination is sufficiently high, the second camera 130 may acquire a plurality of frames in relation to the peripheral image. As above, frame control may be optimized according to illumination. Therefore, the digital image stabilization apparatus of the present inventive concepts may further include an illumination sensor.

Figure 6:
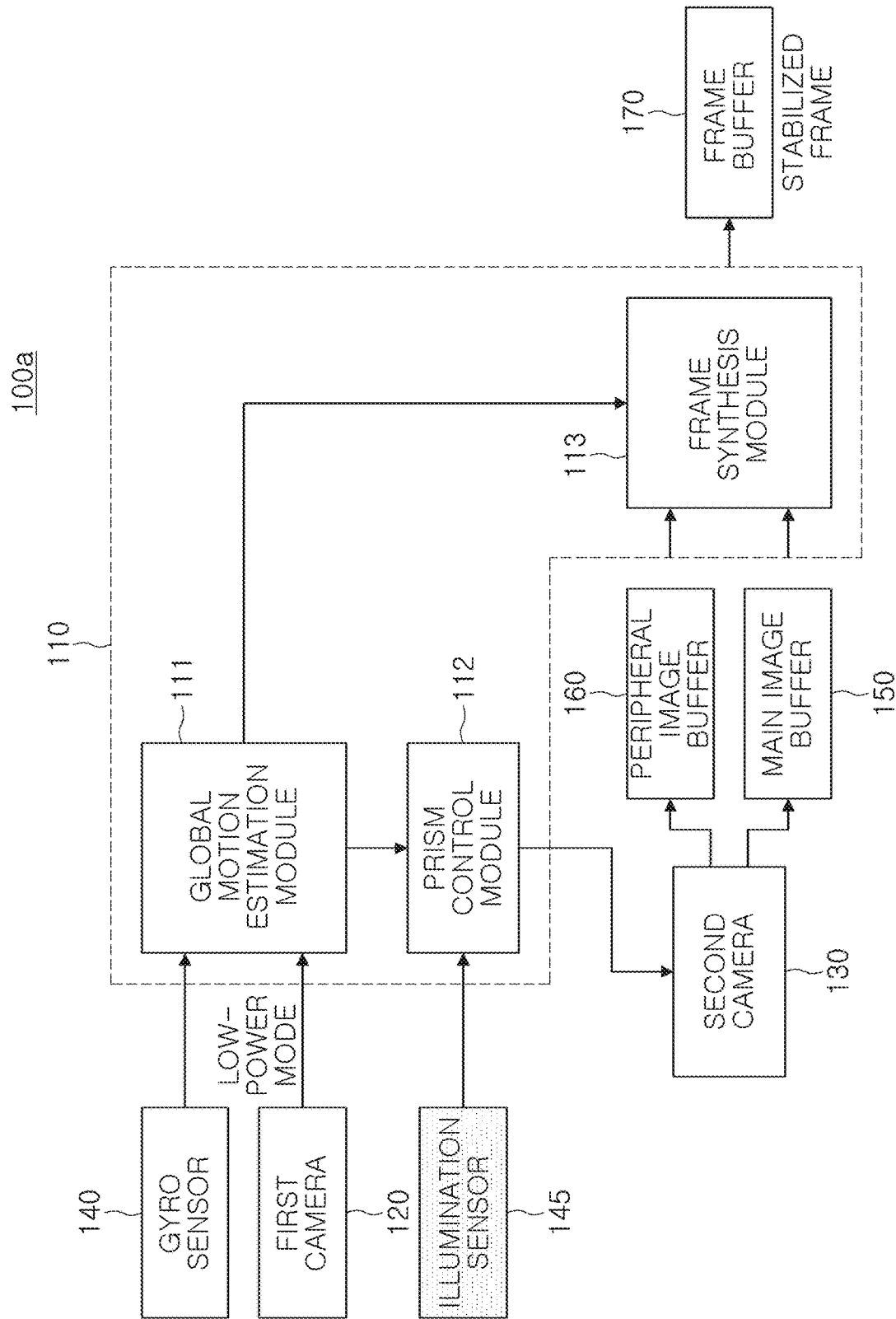
FIG. 6 is a view illustrating a digital image stabilization apparatus 100a according to another example embodiment of the present inventive concepts.

FIG. 6 is a view illustrating a digital image stabilization apparatus 100a according to another example embodiment of the present inventive concepts. Referring to FIG. 6, a digital image stabilization apparatus 100a may further include an illumination sensor 145, compared to the digital image stabilization apparatus 100 illustrated in FIG. 5.

A prism control module 112 may differently control a second camera 130, according to an illumination value detected by the illumination sensor 145. For example, the prism control module 112 may determine the number of frames corresponding to a peripheral image to be acquired from the second camera 130, according to the illumination value. In an example embodiment, when the illumination value is greater than or equal to a reference value, the prism control module 112 may control the second camera 130 to acquire a plurality of peripheral image frames. In an example embodiment, when the illumination value is less than the reference value, the prism control module 112 may control the second camera 130 to acquire one peripheral image frame.

A digital image stabilization apparatus according to an example embodiment of the present inventive concepts may further include a buffer for storing a preview image through a preview path.

Figure 7:
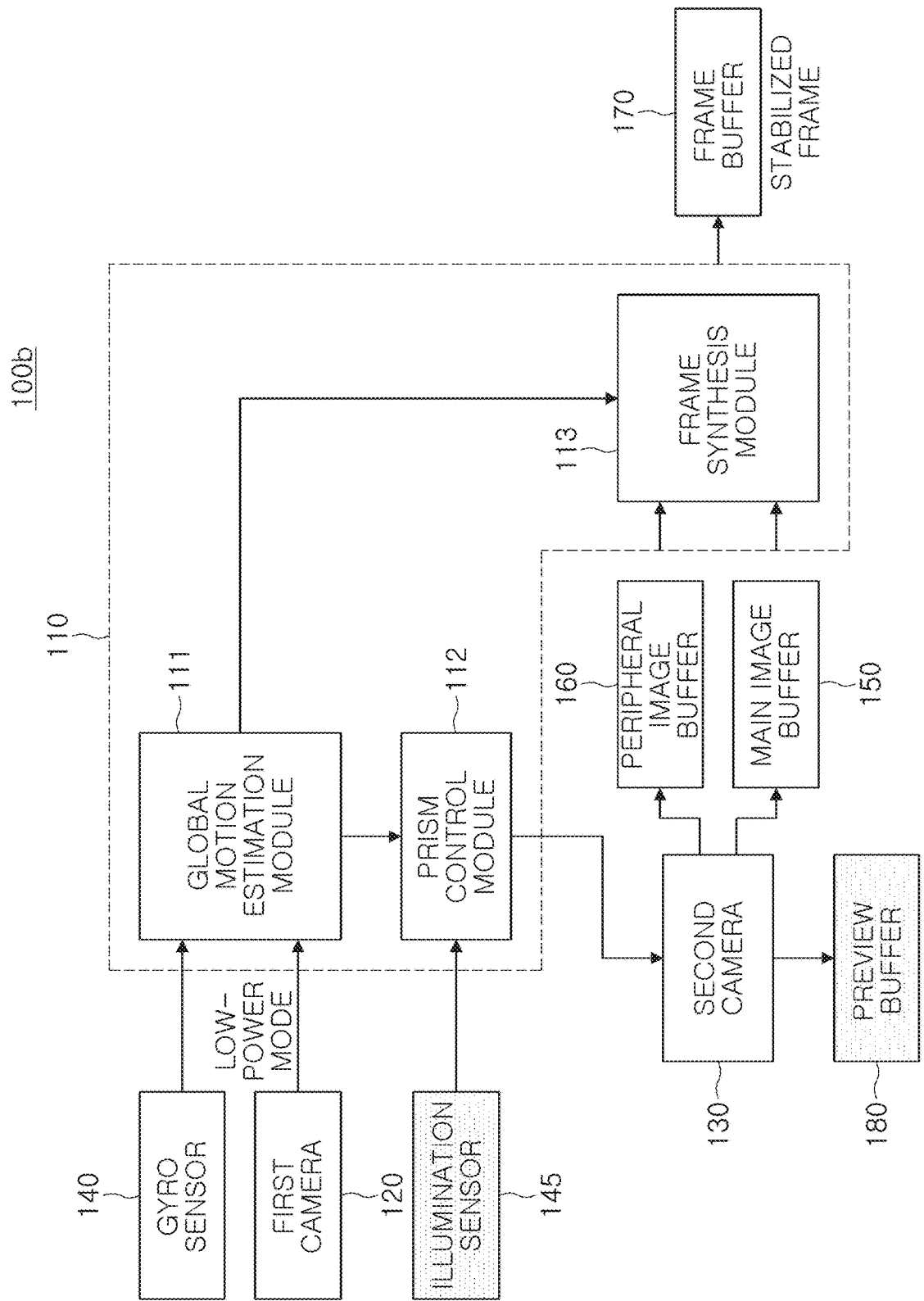
FIG. 7 is a view illustrating a digital image stabilization apparatus 100b according to another example embodiment of the present inventive concepts.

FIG. 7 is a view illustrating a digital image stabilization apparatus 100b according to another example embodiment of the present inventive concepts. Referring to FIG. 7, a digital image stabilization apparatus 100b may further include a preview buffer 180 for storing a preview image through a preview path, from a second camera 130, compared to the digital image stabilization apparatus 110a illustrated in FIG. 6.

Figure 8:
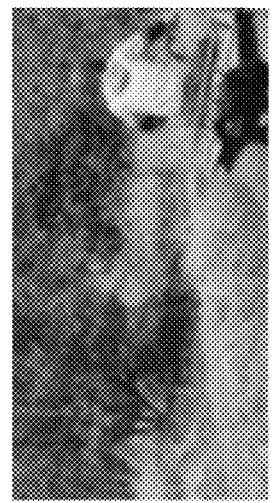
FIG. 8 is a view illustrating performing a digital image stabilization function in a conventional camera module.

FIG. 8 is a view illustrating performing a digital image stabilization function in a conventional camera module. In order to implement video stabilization, a conventional camera module may use an image of a peripheral portion as a buffer, in addition to a region of a field of view, to be finally output. For example, in an actual input size of a physical sensor, a certain peripheral region (e.g., a margin) may be lost, when finally saving a video. In general, in order to perform an average video stabilization function, 8 to 10% (based on one surface) of an entire area of the physical sensor may be used as a buffer (e.g., a margin). When calculated using a field of view, loss of 16 to 20% may occur. In order to perform a high-performance video stabilization function on an action cam level, about 25% of the margin may be desired. In this case, 50% loss of the field of view may occur.

Further, in the conventional camera module, physical resolution of the sensor may be not sufficient, and may be smaller than final target output resolution, except for the margin. For example, when a 12MP 4:3 sensor crops to 16:9 for a video, only 2% of the margin for 4K video recording may remain. In this case, when a video stabilization function that requires 8% of the margin is used, an up-scaling operation should be done through a scaler. Therefore, deterioration of image quality may be inevitably caused.

Figure 9:
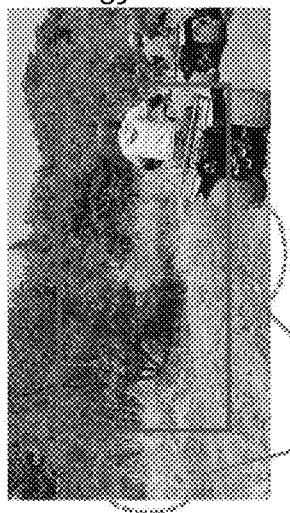
FIG. 9 is a view illustrating performing a digital image stabilization function in a digital image stabilization apparatus 100 according to an example embodiment of the present inventive concepts.

FIG. 9 is a view illustrating performing a digital image stabilization function in a digital image stabilization apparatus 100 according to an example embodiment of the present inventive concepts. Referring to FIG. 9, a digital image stabilization apparatus 100 may control a high-speed prism to move a field of view itself acquired by a sensor, to additionally acquire a peripheral image having the same image quality. The peripheral image acquired by driving the prism may be used as a margin region of a video stabilization algorithm. In this case, there is no need to use portion of a region of a basic field of view as the margin region. Therefore, there may be no loss of the basic field of view. Further, since no margin is used, an additional up-scaling operation may not be needed. Thus, no deterioration of image quality due to scaling may occur.

Figure 10:
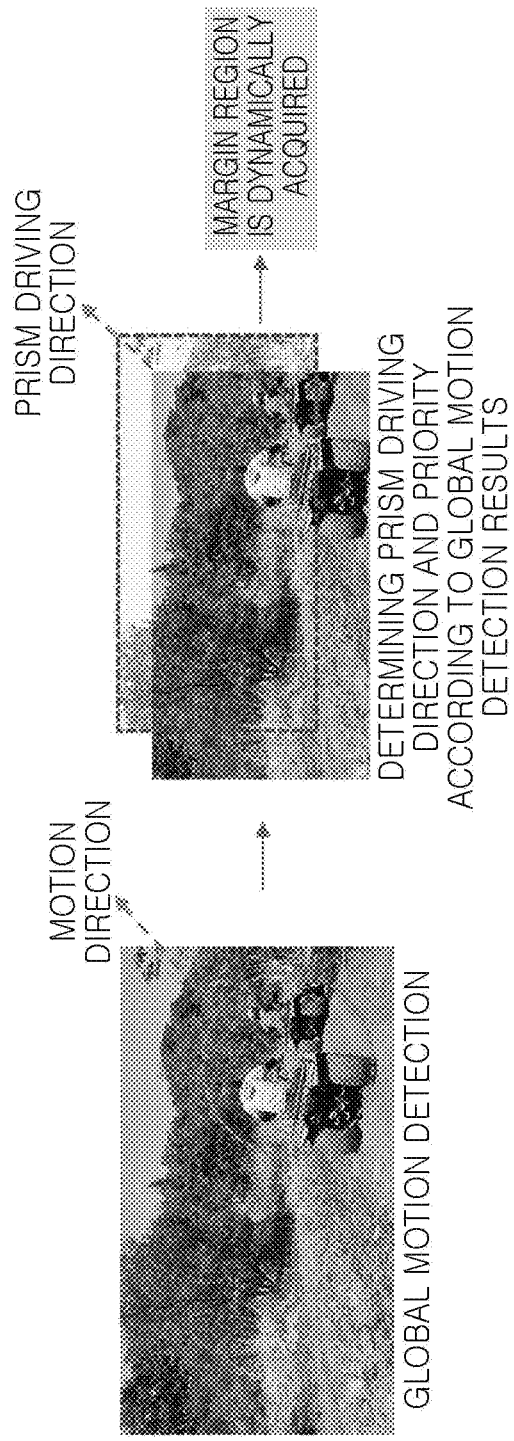
FIG. 10 is a view illustrating performing a digital image stabilization function in a camera module according to an example embodiment of the present inventive concepts.

FIG. 10 is a view illustrating performing a digital image stabilization function in a camera module according to an example embodiment of the present inventive concepts. Referring to FIG. 10, global motion detection may be performed from an image acquired by a first camera. A driving direction and a priority of a prism of a second camera may be determined according to global motion detection results. Thereafter, a margin region may be dynamically acquired from the second camera according to movement of a subject.

Figure 11A:
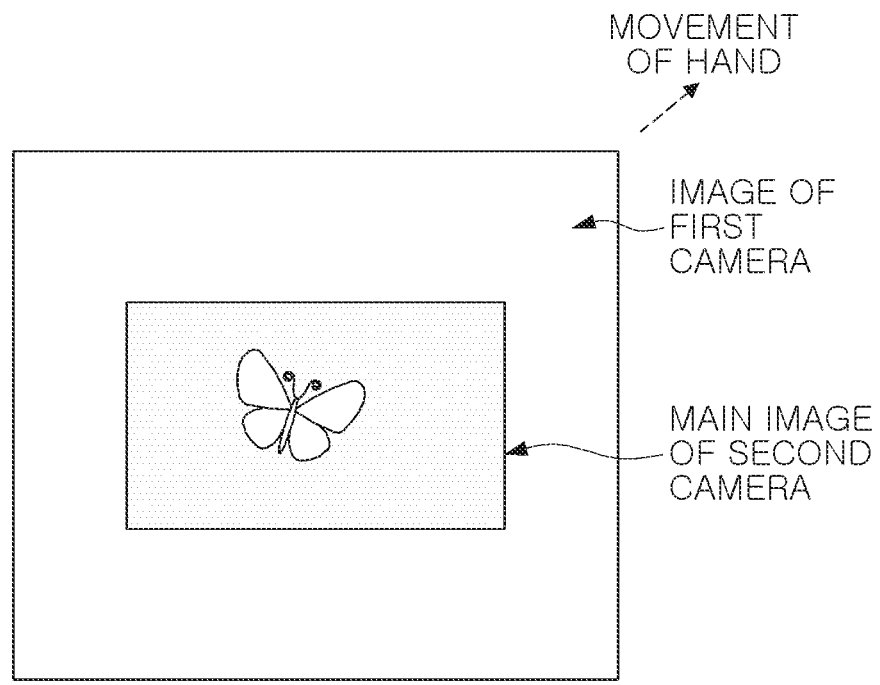
FIGS. 11A, 11B, 11C, and 11D are views illustrating a digital image stabilization operation according to an example embodiment of the present inventive concepts.
Figure 11B:
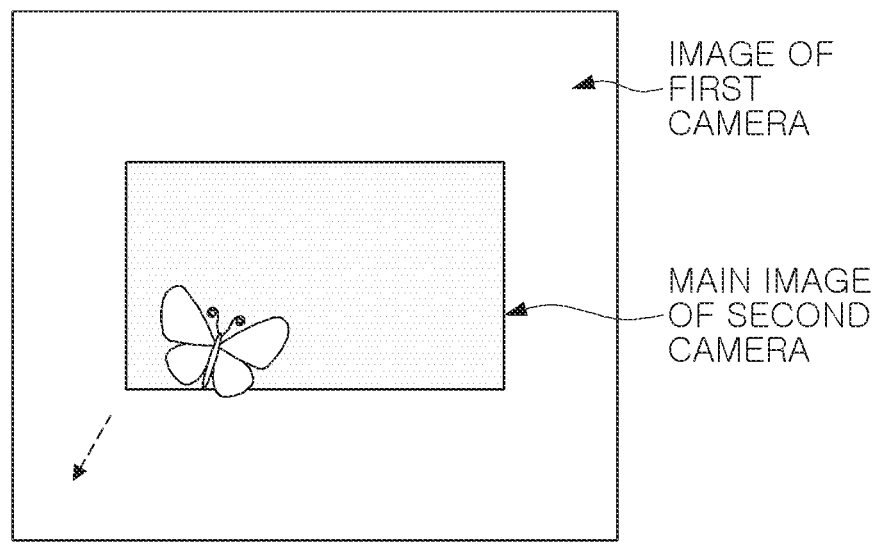
Figure 11C:
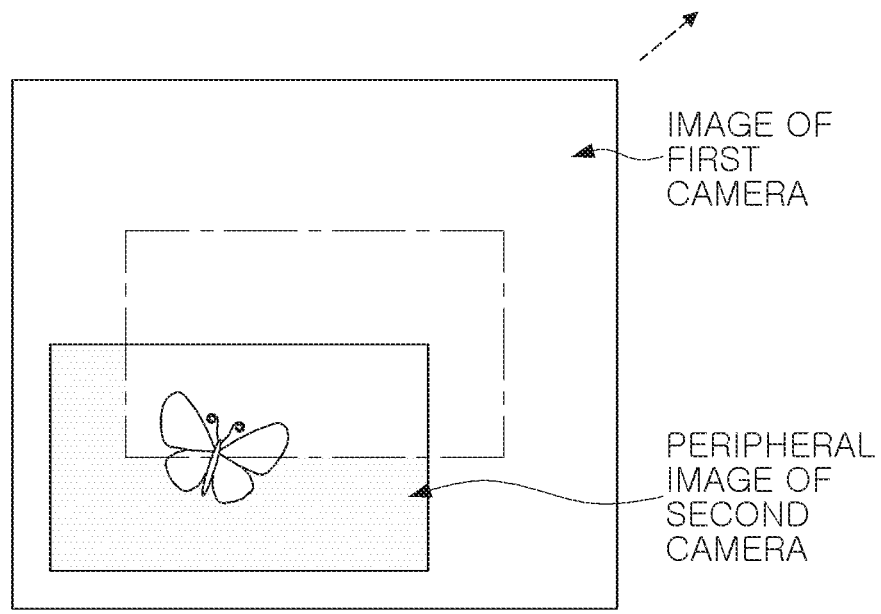
Figure 11D:
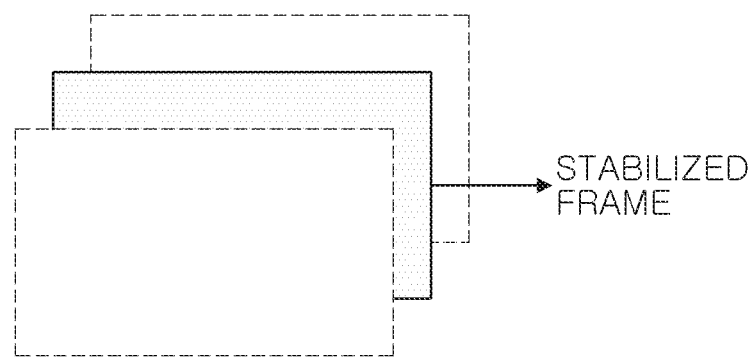

FIGS. 11A, 11B, 11C, and 11D are views illustrating a digital image stabilization operation according to an example embodiment of the present inventive concepts. As illustrated in FIG. 11A, when a camera module is to capture a flying butterfly, data of a global motion-related image may be collected by a first camera, and data of a main image may be collected by a second camera. In this case, when movement of a hand holding the camera module from the data of the global motion-related image acquired by the first camera in a right and upward direction is predicted, the main image of the second camera will move in a left and downward direction as illustrated in FIG. 11B. In addition, a prism of the second camera may be controlled according to the data of the global motion-related image, to acquire a peripheral image frame corresponding to the main image from the second camera as illustrated in FIG. 11C. Thereafter, as illustrated in FIG. 11D, a stabilized frame may be generated by synthesizing a main image frame and the peripheral image frame.

Figure 12:
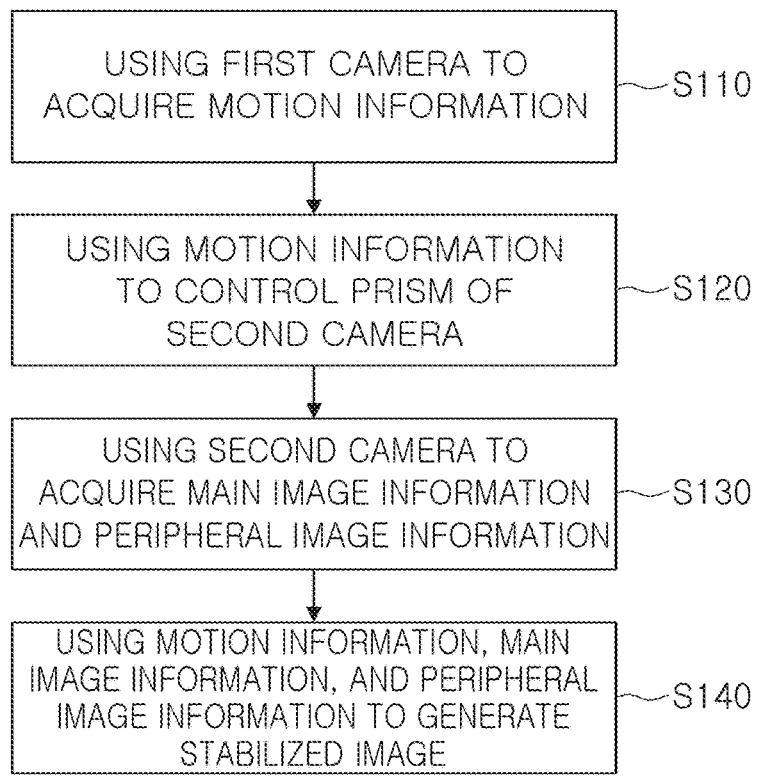
FIG. 12 is a flowchart illustrating a method of operating a digital image stabilization apparatus according to an example embodiment of the present inventive concepts.

FIG. 12 is a flowchart illustrating a method of operating a digital image stabilization apparatus according to an example embodiment of the present inventive concepts. Referring to FIGS. 5 to 12, a method of operating a digital image stabilization apparatus 100 may proceed as follows.

A first camera 120 may be used to acquire motion information (S110). The motion information may be analyzed to determine a hand-shaking direction or a moving direction of an object. In an example embodiment, since there is a repetitive pattern such as vibration, a gyro sensor may be used to predict a shaking direction of the entire image. The motion information may be used to control a prism of a second camera (S120). A main image and a peripheral image may be acquired from the second camera (S130). Thereafter, the motion information and peripheral image information may be used to generate a stabilized image for the main image (S140).

In an example embodiment, the acquiring the motion information may include receiving position information from an acceleration sensor. In an example embodiment, the motion information may include motion direction information according to movement of the object.

In an example embodiment, the controlling the prism may include determining a driving direction of the prism, and determining a priority of the prism for a movement direction.

Since it is difficult to predict the shaking at a start point of capturing, the prism of the second camera may be driven to store peripheral frames in four directions (e.g., upward, downward, left, and right directions) in a buffer.

Figure 13:
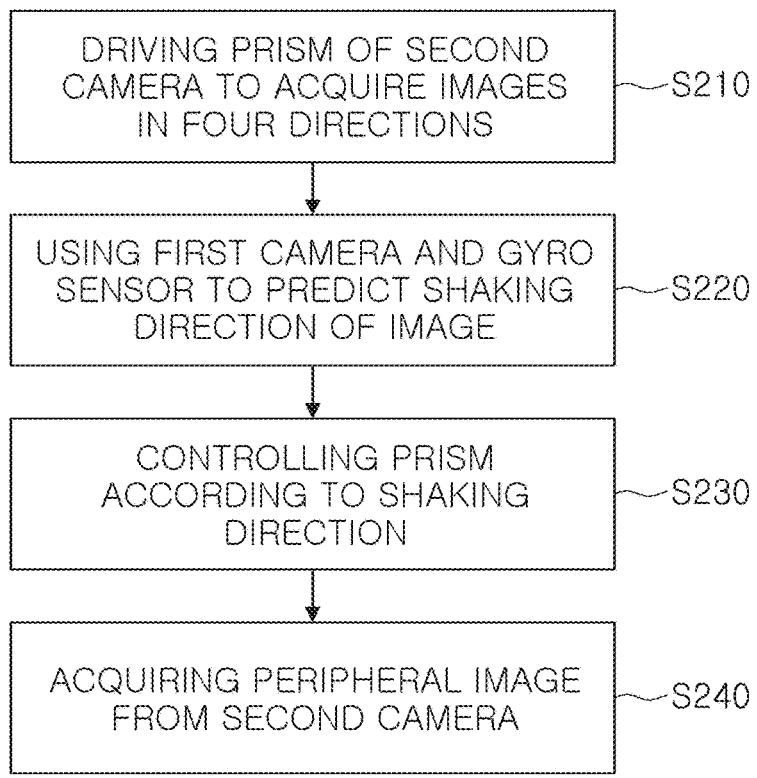
FIG. 13 is a flowchart illustrating a method of operating a digital image stabilization apparatus according to another example embodiment of the present inventive concepts.

FIG. 13 is a flowchart illustrating a method of operating a digital image stabilization apparatus according to another example embodiment of the present inventive concepts. Referring to FIGS. 5 to 13, a method of operating a digital image stabilization apparatus may proceed as follows.

An object may be captured and a prism of a second camera may be driven, at the same time, to acquire image data in four directions (upward, downward, left, and right directions) (S210). The acquired image data, and sensor data received from a first camera and a gyro sensor may be used to predict a shaking direction of an image (S220). The prism of the second camera may be controlled according to the shaking direction in order to acquire a peripheral image for a main image (S230). Thereafter, main image and peripheral image data may be acquired from the second camera (S240).

A digital image stabilization technique of the present inventive concepts may be applicable to a mobile device having three cameras.

Figure 14A:
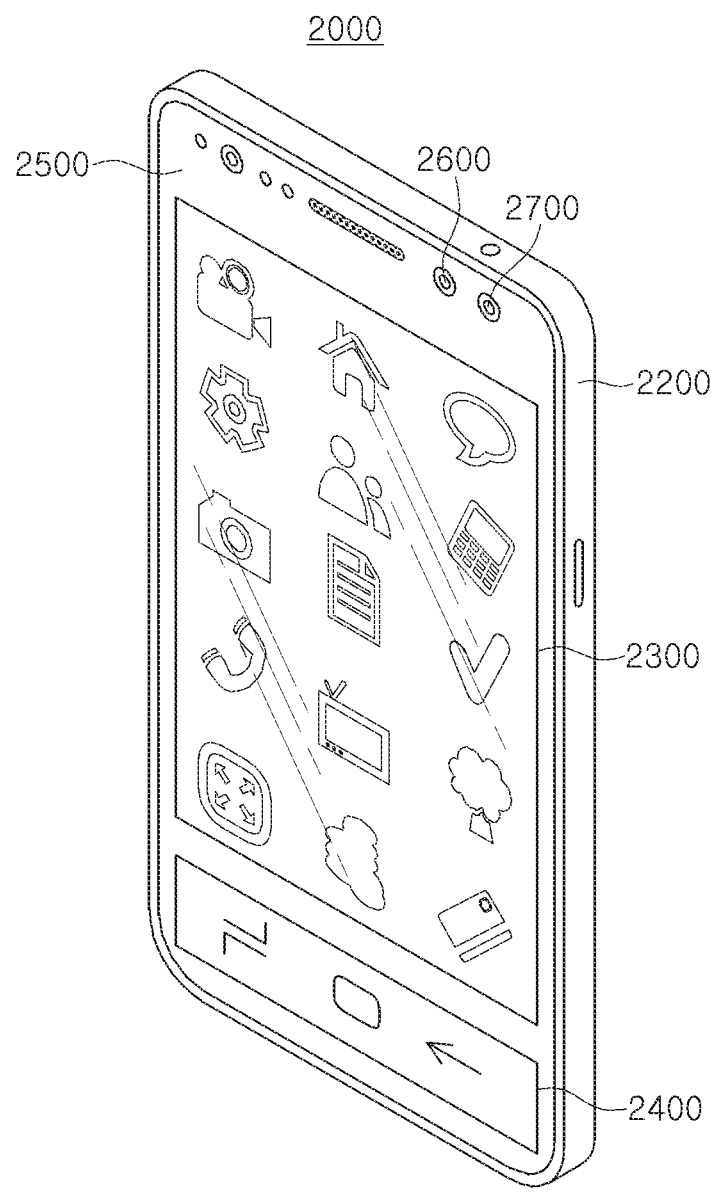
FIGS. 14A and 14B are views illustrating a mobile device 2000 according to an example embodiment of the present inventive concepts.
Figure 14B:
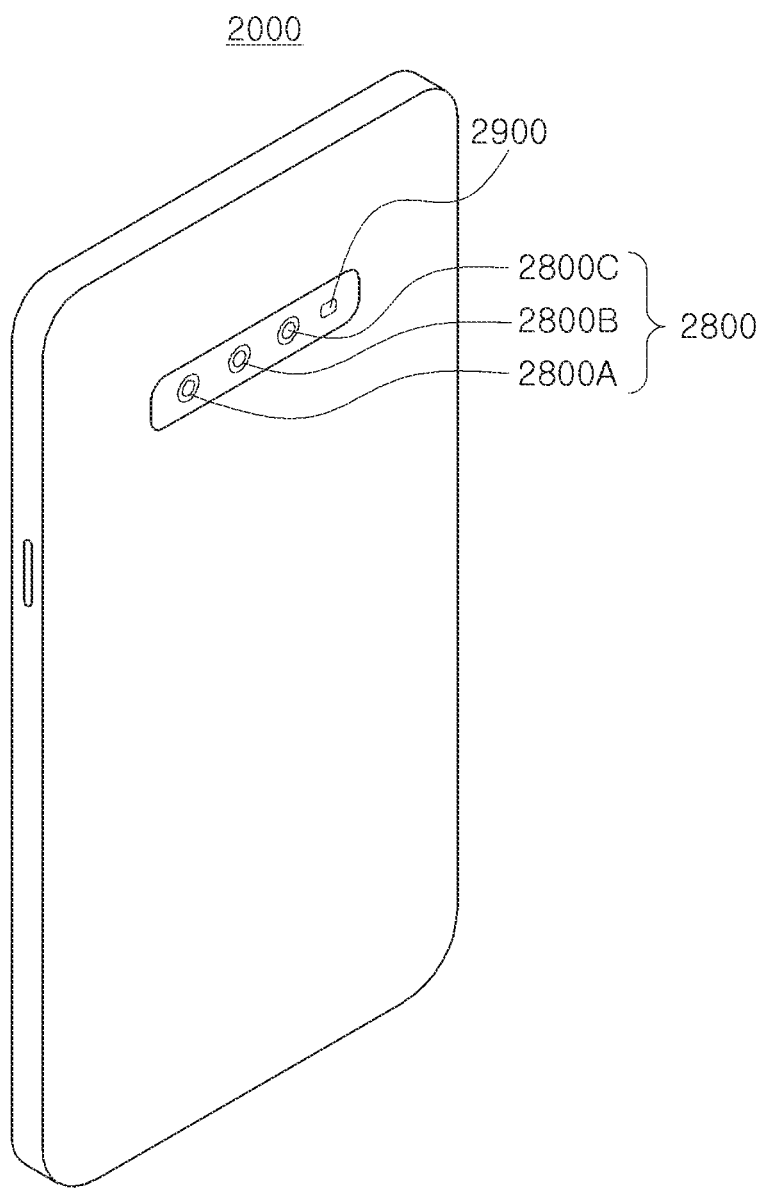

FIGS. 14A and 14B are views illustrating a mobile device 2000 according to an example embodiment of the present inventive concepts. Referring to FIGS. 14A and 14B, a mobile device 2000 may include a housing 2200, a display device 2500, and cameras 2600, 2700, and 2800.

In an example embodiment, the display 2500 may substantially cover an entire front surface of the housing 2200, and a first region 2300 and a second region 2400 may be determined and operated, according to an application program in an operating mode of or under execution of the mobile device 2000.

Referring to FIG. 14A, front cameras 2600 and 2700 may include a first front camera 2600 and a second front camera 2700, having different characteristics. For example, the first front camera 2600 and the second front camera 2700 may have different values in aperture value, focal length, field of view, or the like. In this case, the first front camera 2600 may be a conventional camera, and the second front camera 2700 may be a time-of-flight (ToF) camera. When the second front camera 2700 is a ToF camera, the second front camera 2700 may be combined with a separate light source to provide a distance measurement function, a depth map generation function, and/or a face recognition function.

Referring to FIG. 14B illustrating a rear surface of the mobile device 2000, the mobile device 2000 may include a rear camera 2800 and a light emitting unit 2900. The rear camera 2800, in a similar manner to the front cameras 2600 and 2700, may include a plurality of rear cameras 2800A, 2800B, and 2800C, in which at least one of an aperture value, a field of view, and the number of pixels of an image sensor are different. The light emitting unit 2900 may employ an LED or the like as a light source, and may operate as a flash in an application program using the rear camera 2800. At least one of the plurality of cameras 2600, 2700, and 2800 may include a lens, an image sensor, a motor unit, or an engine unit. At least one of the plurality of rear cameras 2800A, 2800B, and 2800C may perform the function of the first camera described above, and the other may perform the function of the second camera described above.

The image sensor may provide RGB data, based on a clock signal. For example, the image sensor may interface with the engine unit by a mobile industry processor interface (MIPI) or a camera serial interface (CSI). The motor unit may adjust focus of the lens or perform shuttering in response to a control signal received from the engine unit. The engine unit may control the image sensor and the motor unit. For example, the engine unit may generate YUV data including a luminance component, a difference between a luminance component and a blue component, and a difference between a luminance component and a red component, based on RGB data received from the image sensor, or may generate compressed data, for example, joint photography experts group (JPEG) data. The engine unit may be connected to a host/an application program, and the engine unit may provide YUV data or JPEG data to the host/the application program, based on a master clock. For example, the engine unit may interface with the host/the application program by a serial peripheral interface (SPI) or an inter integrated circuit (I2C).

FIG. 15 is a view illustrating cases in which a digital image stabilization technique of the rear cameras 2800A, 2800B, and 2800C illustrated in FIG. 14B is applied. Referring to FIG. 15, the camera 2800A may be a telephoto camera, the camera 2800B may be a wide-angle camera, and the camera 2800C may be an ultra-wide-angle camera. The telephoto camera may be implemented to have a first focal length f1. The wide-angle camera may be implemented to have a second focal length f2. The ultra-wide-angle camera may be implemented to have a third focal length f3. In an example embodiment, the third focal length f3 may be longer than the second focal length f2, and the second focal length f2 may be longer than the first focal length f1.

As illustrated in FIG. 15, in case 1, the first camera 1310 may be a wide-angle camera, and the second camera 1320 may be a telephoto camera. In case 2, the first camera 1310 may be an ultra-wide-angle camera, and the second camera 1320 may be a wide-angle camera.

A digital image stabilization technique according to an example embodiment of the present inventive concepts may be applicable to a foldable smartphone. In general, the foldable smartphone may be implemented in various foldable display forms such as a C-INFOLD form, a C+1 form, a G form, a C-OUTFOLD form, an S form, and the like. For example, the foldable smartphone may be divided into an in-fold structure and an out-fold structure, depending on a folding manner.

Figure 16:
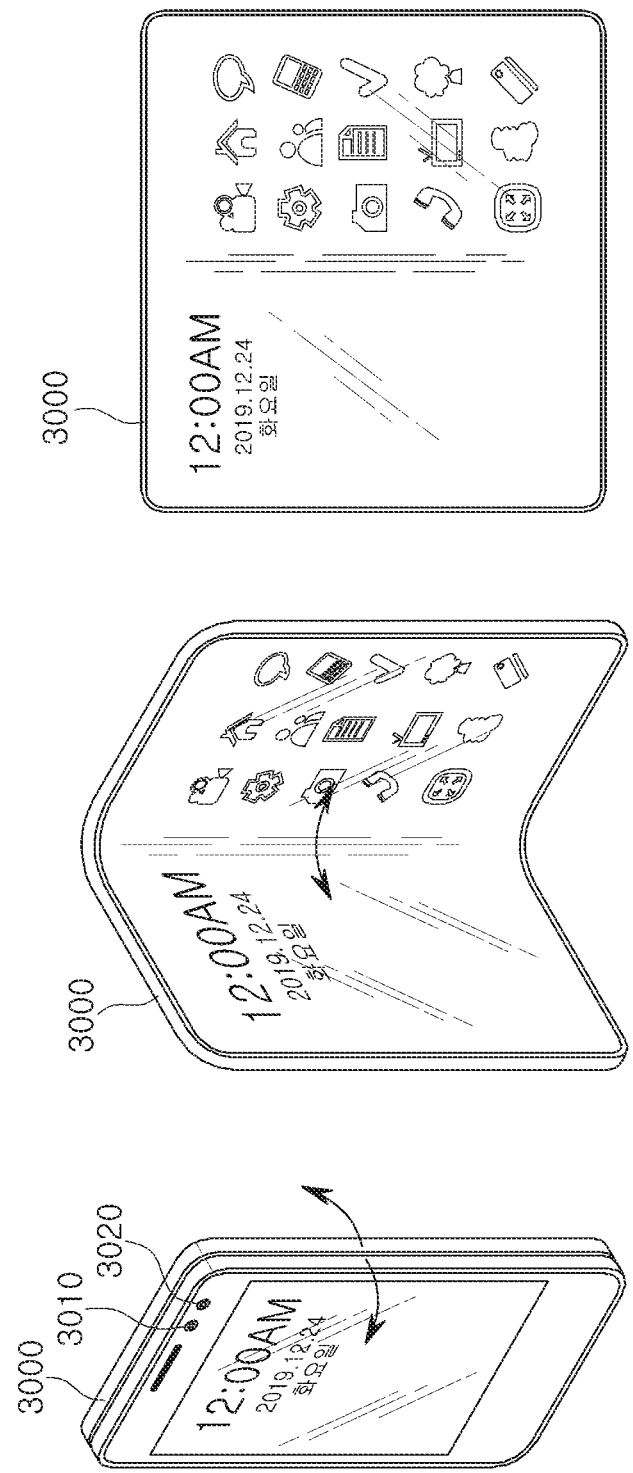
FIG. 16 is a view illustrating a foldable smartphone 3000 according to an example embodiment of the present inventive concepts.

FIG. 16 is a view illustrating a foldable smartphone 3000 according to an example embodiment of the present inventive concepts. Referring to FIG. 16, a foldable smartphone 3000 may have a structure in which a display screen is folded inward. For example, the foldable smartphone 3000 may be Samsung Electronics' Galaxy Fold. The Galaxy Fold may have another display on its external surface for use when folded, and thus may be the 'C+1 form' according to the above classification. Unlike the out-fold structure, the display may be unfolded neatly, since deviation in length of the surface is relatively small when folded.

As illustrated in FIG. 16, the foldable smartphone 3000 may include a first camera 3010 and a second camera 3020, which apply a digital image stabilization technique to its front surface.

Figure 17:
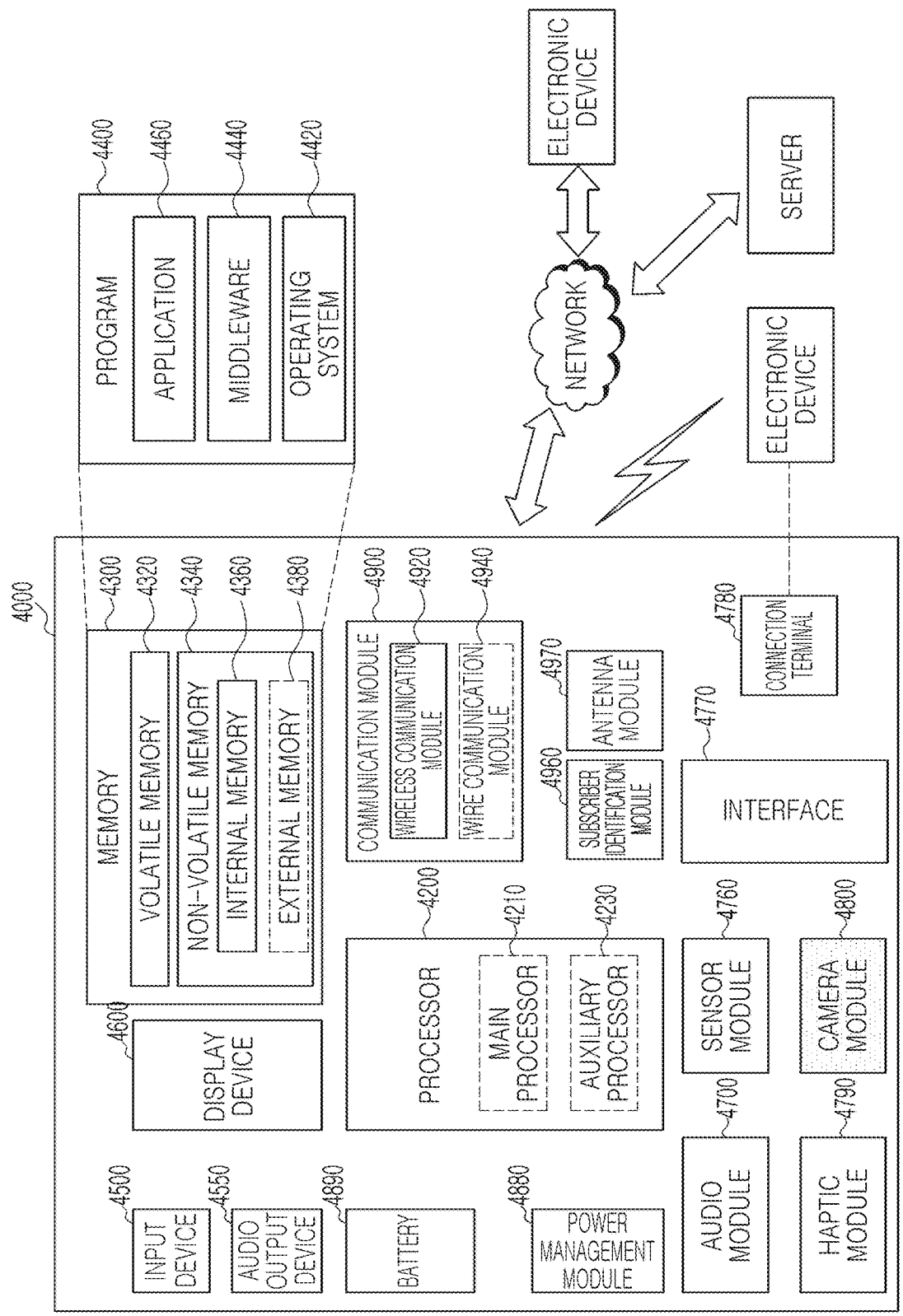
FIG. 17 is a view illustrating an electronic device according to an example embodiment of the present inventive concepts.

FIG. 17 is a view illustrating an electronic device according to an example embodiment of the present inventive concepts. FIG. 17 is a block diagram illustrating an electronic device 4000 according to an example embodiment of the present inventive concepts. In a network environment, an electronic device 4000 may communicate with other electronic devices by a first network (e.g., short-distance wireless communication), or may communicate with other electronic device or a server by a second network (e.g., long-distance wireless communication). The electronic device 4000 may include, for example, at least one of a smartphone, a tablet personal computer (PC), a mobile phone, a video phone, an e-book reader, a desktop personal computer, a laptop personal computer (PC), a netbook computer, a workstation, a server, a personal digital assistant (PDA), a portable multimedia player (PMP), an MP3 player, a mobile medical device, a camera, or a wearable device. According to an example embodiment, the wearable device may include at least one of an accessory type of wearable device (for example, a watch, a ring, a bracelet, a anklet, a necklace, glasses, a contact lens, or a head-mounted device (HMD)), a fabric or garment type of wearable device (e.g., an electronic clothing), a body-attached type of wearable device (e.g., a skin pad or tattoo), or a bio-implantable type of wearable device (e.g., an implantable circuit).

Referring to FIG. 17, the electronic device 4000 may include a processor 4200, a memory 4300, an input device 4500, an audio output device 4550, a display device 4600, an audio module 4700, a sensor module 4760, an interface 4770, a haptic module 4790, a camera module 4800, a power management module 4880, a battery 4890, a communication module 4900, a subscriber identification module 4960, and an antenna module 4970. In an example embodiment, in the electronic device 4000, at least one of the components may be omitted or additional component(s) may be added. For example, in a case in which the sensor module 4760 (e.g., a fingerprint sensor, an iris sensor, or an illumination sensor)

is embedded, the display device 4600 may be implemented by integrating a portion of the components.

The processor 4200 may drive software (e.g., a program 1400) to control at least one other component (e.g., a hardware component or a software component) of the electronic device 4000, connected to the processor 4200, to process and calculate various data. In addition, the processor 4200 may load a command or data, received from other component(s) (for example, the sensor module 4760 or the communication module 4900), onto a volatile memory 4320, and may process the loaded component(s), and the result data therefrom may be stored in a non-volatile memory 4340.

In an example embodiment, the processor 4200 may operate independently of a main processor 4210 (e.g., a central processing unit or an application processor), and, additionally/alternately, may use less power than the main processor 4210, or may include an auxiliary processor 4230 (e.g., a graphics processing processor, an image signal processor, a sensor hub processor, a communication processor, or an artificial intelligence processor), specialized for a given function.

In an example embodiment, the auxiliary processor 4230 may be operated separately from or may be operated in a state embedded into the main processor 4210. The auxiliary processor 4230 may control at least a portion of functions or states associated with at least one of the components of the electronic device 4000 (e.g., the display device 4600, the sensor module 4760, or the communication module 4900), instead of the main processor 4210 while the main processor 4210 is in an inactive (sleep) state, or together with the main processor 4210 while the main processor 4210 is in an active state (in an application program executing state). In an example embodiment, the auxiliary processor 4230 may be implemented as a portion of other functionally relevant components (e.g., the camera module 4800 or the communication module 4900).

The memory 4300 may store various data used in at least one component (e.g., the processor 4200 or the sensor module 4760) of the electronic device 4000, for example, input data or output data for software and instructions related thereto. The memory 4300 may include the volatile memory 4320 or the non-volatile memory 4340.

The program 4400 may be software stored in the memory 4300, and may include an operating system 4420, middleware 4440, or an application program 4460.

The input device 4500 may be a device for receiving commands or data to be used for components (processor 4200) of the electronic device 4000 from the outside (e.g., a user) of the electronic device 4000, and may include, for example, a microphone, a mouse, or a keyboard.

The audio output device 4550 may be a device for outputting an audio signal to the outside of the electronic device 4000, and may include, for example, a speaker used for general purposes, such as multimedia playback or recording playback, and a receiver used only for receiving calls. It may contain. In an example embodiment, the receiver may be formed integrally or separately from the speaker.

The display device 4600 may be implemented to visually provide information to a user of the electronic device 4000. For example, the display device 4600 may include a display, a hologram device, or a projector, and a control circuit for controlling the device. In an example embodiment, the display device 4600 may include a touch circuitry or a pressure sensor capable of measuring intensity of pressure on a touch. In addition, the display device 4600 may be as a display device enabling dual source output, and may be implemented by a method of operating the same.

The audio module 4700 may convert sound and electric signals in both directions. In an example embodiment, the audio module 4700 may acquire sound by the input device 4500, or may output the sound by the audio output device 4550, or an external electronic device (e.g., a speaker or a headphone) connected to the electronic device 4000 in a wired or wireless manner.

The sensor module 4760 may generate an electrical signal or data value, corresponding to an internal operating state (e.g., power or temperature) of the electronic device 4000 or an external environmental state. For example, the sensor module 4760 may include a gesture sensor, a gyro sensor, a barometric pressure sensor, a magnetic sensor, an acceleration sensor, a grip sensor, a proximity sensor, a color sensor, an infrared (IR) sensor, a biological sensor, a temperature sensor, a humidity sensor, or an illumination sensor.

The interface 4770 may support a given protocol that may be connected to an external electronic device in a wired or wireless manner. In an example embodiment, the interface 4770 may include a high definition multimedia interface (HDMI), a universal serial bus (USB) interface, an SD card interface, or an audio interface.

A connection terminal 4780 may include a connector (for example, an HDMI connector, a USB connector, an SD card connector, or an audio connector (e.g., a headphone connector)) that may physically connect the electronic device 4000 and an external electronic device.

The haptic module 4790 may convert electrical signals into mechanical stimuli (vibrations or movements) or electrical stimuli that a user may perceive through tactile or motor sensation. The haptic module 4790 may include, for example, a motor, a piezoelectric element, or an electrical stimulation device.

The camera module 4800 may be implemented to capture a still image and a video. In an example embodiment, the camera module 4800 may include one or more lenses, image sensors, image signal processors, or flashes. The camera module 4800 may include pixels selecting a conversion gain optimally according to an operation mode, and may control the pixels. The camera module 4800 may be implemented to perform the digital image stabilization functions described in FIGS. 1 to 13.

The power management module 4880 may be a module for managing power supplied to the electronic device 4000, and may be configured, for example, as at least a portion of a power management integrated circuit (PMIC). The battery 4890 may be a device for supplying power to at least one component of the electronic device 4000, and may include, for example, a non-rechargeable primary cell, a rechargeable secondary cell, or a fuel cell.

The communication module 4900 may support establishing a wired or wireless communication channel between the electronic device 4000 and an external electronic device, and performing communications by the established communication channel. The communication module 4900 may include one or more communication processors supporting wire communications or wireless communications, which may be independently operated from the processor 4200 (e.g., an application processor).

In an example embodiment, the communication module 4900 may include a wireless communication module 4920 (e.g., a cellular communication module, a short-distance wireless communication module, or a global navigation satellite system (GNSS) communication module) or a wire communication module 4940 (e.g., a local area network (LAN) or a power line communication module). The communication module 4900 may use a corresponding wire/wireless communication module to communicate with external electronic devices by a first network (for example, a short-distance communication network such as Bluetooth, Wi-Fi direct, or infrared data association (IrDA)) or a second network (for example, a cellular network, the Internet, or a long-distance communication network such as a computer network (LAN or WAN)). In an example embodiment, the communication module 4900 may be implemented as one chip, or may be implemented as separate chips.

In an example embodiment, the wireless communication module 4920 may use user's information stored in the subscriber identification module 4960 to distinguish and authenticate the electronic device 4000 in the communication network.

The antenna module 4970 may include one or more antennas for transmitting a signal or power to the outside or receiving the same from the outside. In an example embodiment, the communication module 4900 may transmit or receive a signal to or from an external electronic device by an antenna suitable for a communication method.

A portion of the components may be connected to each other by a communication method between peripheral devices (e.g., a bus, a general purpose input/output (GPIO), a serial peripheral interface (SPI), or a mobile industry processor interface (MIPI)), to exchange a signal (e.g., a command or data).

In an example embodiment, the command or data may be transmitted or received between the electronic device 4000 and an external electronic device by a server connected to the second network. Each of the electronic devices may be the same or a different type of device from the electronic device 4000. In an example embodiment, all or portion of the operations executed in the electronic device 4000 may be executed in another one or a plurality of external electronic device(s). In an example embodiment, when the electronic device 4000 needs to perform a certain function or service automatically or on request, the electronic device 4000 may request a portion of the functions associated therewith to an external electronic device, instead of or in addition to execution of the function or service itself, or the function or service. The external electronic device receiving the request may execute a requested function or an additional function, and may deliver the results therefrom to the electronic device 4000. The electronic device 4000 may process the received results, as they are or additionally, to provide the requested function or service. To this end, for example, a cloud computing technique, a distributed computing technique, or a client-server computing technique may be used.

The electronic device 4000 may be various types of devices. For example, the electronic device 4000 may include at least one of a portable communication device (e.g., a smartphone), a computer device, a portable multimedia device, a portable medical device, a camera, a wearable device, or a home appliance.

The term "module" used in the present inventive concepts may include a unit composed of hardware, software, or firmware, and may be used interchangeably with terms such as logic, logic blocks, components, or circuits. Some example embodiments of integrally configured components in the present inventive concepts may be implemented with software (e.g., the program 4400) including commands stored in storage media (e.g., a machine-readable storage media) (e.g., an internal memory 4360 or an external memory 4380). The device may be a device capable of invoking the command stored by the storage media, and operating according to the invoked command, and may include an electronic device (e.g., the electronic device 4000) according to the disclosed example embodiments. When a command is executed by a processor (for example, the processor 4200), the processor may perform a function corresponding to the command directly or may perform the function by using other components under control of the processor. The command may include a code generated or executed by a compiler or an interpreter. A storage media readable by the device may be provided in the form of a non-transitory storage media. In this case, 'non-transitory' may refer that a storage media does not contain a signal and is tangible, but does not distinguish from storing data semi-permanently or temporarily in the storage media.

Digital image stabilization apparatuses, operation methods thereof, and electronic devices having the same, according to some example embodiment of the present inventive concepts, may perform a high-performance video stabilization function without loss of field of view or deterioration of image quality, by driving a prism in a camera module capable of driving the prism to control a field of view, to acquire a high-resolution image peripheral area desired for video stabilization.

The units and/or modules described herein may be implemented using hardware components, software components, or a combination of software components and hardware component. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device(s) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors, multi-core processors, distributed processing, or the like.

While some example embodiments have been illustrated and described above, it will be apparent to those skilled in the art that modifications and variations could be made without departing from the scope of the present inventive concepts as defined by the appended claims.

What is claimed is:

1. A digital image stabilization apparatus comprising:
   a first camera configured to acquire a first image of a first field of view;
   a second camera configured to acquire a second image of a second field of view, the second field of view being narrower than the first field of view;
   a first buffer memory configured to receive and store a main image of the second field of view for an object from the second camera;

a second buffer memory configured to receive and store a peripheral image for the main image from the second camera; and a processor configured to control the first camera, the second camera, the first buffer memory, and the second buffer memory and perform a digital image stabilization function by synthesizing a frame image for the object using the main image and the peripheral image from the second camera, wherein the processor is configured to control a prism of the second camera using motion information estimated from the first image, for acquiring the peripheral image from the second camera.

2. The digital image stabilization apparatus according to claim 1, further comprising:

a gyro sensor configured to receive movement information of the object.

3. The digital image stabilization apparatus according to claim 1, wherein the first camera is configured to operate in a low-resolution and low-power mode.

4. The digital image stabilization apparatus according to claim 3, wherein the first camera includes a dynamic vision sensor (DVS).

5. The digital image stabilization apparatus according to claim 1, wherein the second camera includes an RGB sensor.

6. The digital image stabilization apparatus according to claim 1, wherein the processor is configured to:

extract motion information for the object using the first image and position information; and control the prism of the second camera using the motion information for the object.

7. The digital image stabilization apparatus according to claim 6, wherein the second camera is configured to store one frame corresponding to the peripheral image in the second buffer memory with regard to one frame corresponding to the main image.

8. The digital image stabilization apparatus according to claim 6, wherein the second camera is configured to store a plurality of frames corresponding to the peripheral image in the second buffer memory with regard to one frame corresponding to the main image.

9. The digital image stabilization apparatus according to claim 6, further comprising:

an illumination sensor configured to sense an illumination value, wherein the processor is further configured to determine a number of frames corresponding to the peripheral image to be acquired from the second camera according to the illumination value.

10. A method of operating a digital image stabilization apparatus, comprising:

acquiring motion information by a first camera for capturing an image of a first field of view;

controlling a prism of a second camera using the motion information for acquiring a peripheral image from the second camera;

acquiring a main image and the peripheral image by the second camera for capturing an image of a second field of view, the second field of view being narrower than the first field of view; and generating a stabilized frame image related to the main image using the motion information, the main image, and the peripheral image.

11. The method according to claim 10, wherein the acquiring the motion information further comprises receiving position information from an acceleration sensor.

12. The method according to claim 10, wherein the motion information comprises motion direction information according to a movement of an object.

13. The method according to claim 10, wherein the controlling the prism comprises:

determining a driving direction of the prism; and determining a priority of the prism for a movement direction.

14. The method according to claim 10, further comprising:

driving the prism of the second camera to acquire images of an object in four directions including upward, downward, left, and right directions.

15. The method according to claim 14, wherein the acquiring the motion information further comprises predicting shaking directions of the images using information of the images of the object in the four directions.

16. The method according to claim 15, wherein the controlling the prism further comprises controlling position of the prism according to the shaking directions.

17. An electronic device comprising:

a camera module having a first camera and a second camera, the first camera configured to capture a first image of a first field of view, the second camera configured to capture a second image of a second field of view, the second camera configured to capture a main image for an object, and the second field of view being narrower than the first field of view;

a memory configured to store a code; and at least one processor configured to, execute the code to control a prism of the second camera using motion information acquired from the first image, for acquiring a peripheral image from the second camera, and perform a digital image stabilization using the motion information, the main image, and the peripheral image.

18. The electronic device according to claim 17, wherein the at least one processor is further configured to extract the motion information using position information acquired from a gyro sensor and an image acquired from the first camera.

19. The electronic device according to claim 17, where the camera module includes at least three cameras, the first camera includes a wide-angle camera, and the second camera includes a telephoto camera.

20. The electronic device according to claim 17, where the camera module includes at least three cameras, the first camera includes an ultra wide-angle camera, and the second camera includes a wide-angle camera.

* * * * *